United States Patent Office 3,457,124
Patented July 22, 1969

3,457,124
CHROMATE CONVERSION COATINGS
Wenzel L. Bohman, Irwin, Pa., assignor to Cowles Chemical Company, Cleveland, Ohio, a corporation of Ohio
No Drawing. Filed Sept. 7, 1966, Ser. No. 577,591
Int. Cl. C23f 7/26
U.S. Cl. 148—6.21                                       10 Claims This invention relates to compositions and processes for producing protective chromate conversion coatings on articles formed of or coated with zinc or cadmium.

Chromate conversion coatings or films are frequently employed on zinc and cadmium metal articles and articles plated with zinc or cadmium. The chromate coatings or films protect the base metal by retarding corrosion on metals that are exposed to outdoor or corrosive indoor environments for prolonged periods and are particularly valuable in eliminating the white corrosion products that are frequently found on zinc and cadmium. The chromate coatings are also used to advantage where a more attractive, decorative finish is desired on the metal articles.

The aqueous compositions of this invention provide a solution which will produce a clear or yellow iridescent conversion coating on a metal surface of zinc or cadmium. This conversion coating provides corrosion protection for the base metal. It further provides a good paint base having good paint adhesion and requiring a minimum amount of paint in order to obtain good paint coverage.

The chromate conversion coating solution reacts with the metal surface so as to form a thin gel-like film of complex chromates on the metal surface. This film is a part of the metal and therefore cannot flake off or peel. The film is non-porous and therefore resists penetration of moisture and thus protects the underlying metal from corrosion. The coating is also non-crystalline and thus provides a good paint bond without the absorption of the paint into the surface.

Briefly, the invention provides yellow or clear chromate conversion coatings on cadmium or zinc by employment of aqueous baths of the following types:

Clear Coatings (1) An aqueous solution of 0.05 to 0.4 ounce per gallon of sodium dichromate, 0.02 to 0.3 ounce per gallon of sulfamic acid, 0.02 to 0.3 ounce per gallon of boric acid, 0.01 to 0.2 ounce per gallon sodium silicofluoride, and 0.5% to 3.0% by volume of nitric acid.

(2) An aqueous solution of 0.05 to 0.3 ounce per gallon of sodium dichromate, 0.05 to 0.3 ounce per gallon of sodium silicofluoride, 0.05 to 0.3 ounce per gallon of ammonium sulfate and 0.5% to 4.0% by volume of nitric acid.

Yellow iridescent coatings (3) An aqueous solution of 0.4 to 1.2 ounces per gallon of chromic acid, 0.05 to 0.25 ounce per gallon of sulfamic acid and 0.01 to 0.2 ounce of ammonium sulfate.

(4) An aqueous solution of 0.1 to 2.5 ounces per gallon of chromic acid, 0.01 to 1.0 ounce per gallon of sodium dichromate, 0.01 to 1.0 ounce per gallon of ammonium sulfate and 0.1% to 2.0% by volume of nitric acid.

A solution containing the following produces a good clear chromate conversion coating:

| | |
|---|---|
| Sodium dichromate _____oz./gal__ | 0.2 |
| Sulfamic acid _____oz./gal__ | 0.1 |
| Boric acid _____oz./gal__ | 0.1 |
| Sodium silicofluoride _____oz./gal__ | 0.06 |
| Nitric acid _____ percent by volume__ | 1.5 |

A bath of the above composition may be prepared by first blending up a liquid concentrate to contain the following:

| | Lb./gal. |
|---|---|
| Sodium dichromate | 0.2 |
| Sulfamic acid | 0.1 |
| Boric acid | 0.1 |
| Sodium silicofluoride | 0.06 |

The working solution is then made up by using 6% by volume of the concentrate, 1.5% by volume of nitric acid, and diluting with water. The solution is used at room temperature with a dip time of approximately 10 seconds.

In a further aspect of the invention, it has been found that a solution of the approximate following composition will produce a good iridescent yellow conversion coating on a cadmium or zinc plate when dipped in the solution for approximately 10 seconds.

| | Oz./gal. |
|---|---|
| Chromic acid | 0.8 |
| Sulfamic acid | 0.13 |
| Ammonium sulfate | 0.07 |

In practice, it has been found convenient to prepare a dry mixture of the following:

| | Parts by weight |
|---|---|
| Chromic acid (ground flake) | 12 |
| Sulfamic acid | 2 |
| Ammonium sulfate | 1 |

A solution containing 1 oz./gal. of the above mixture is used. The solution is operated at room temperature with a 10 second dip. If a deeper color is desired, a longer dip time should be used.

It should be noted that this solution does not contain any nitric acid. All of the required acid is in the dry mixture. The solution preparation is thus simplified since it is unnecessary to add any extra acid.

If it is desired to produce clear or lighter colored coatings, the coating can be bleached by dipping in a caustic soda solution or other bleach dip.

In still another aspect of the invention it has been found that a solution containing the following will produce a good clear conversion coating:

| | |
|---|---|
| Sodium dichromate _____oz./gal__ | 0.17 |
| Sodium silicofluoride _____oz./gal__ | 0.17 |
| Ammonium sulfate _____oz./gal__ | 0.17 |
| Nitric acid _____ percent by volume__ | 2.0 |

In practice, it has been found convenient to prepare a dry mixture of equal parts of sodium dichromate, sodium silicofluoride, and ammonium sulfate. The operating solution is then prepared by dissolving 0.5 oz./gal. of the dry mixture in water and adding 2% by volume of nitric acid. The solution is operated at room temperature with a 10 second dip.

In a still further aspect of the invention, it has been found that a solution of the approximate following composition will produce a good iridescent yellow conversion coating on a cadmium or zinc plate when the object is dipped in the solution for approximately 10 seconds:

| | |
|---|---|
| Chromic acid _____oz./gal__ | 0.75 |
| Sodium dichromate _____oz./gal__ | 0.12 |
| Ammonium sulfate _____oz./gal__ | 0.15 |
| Nitric acid _____ percent by volume__ | 0.5 |

In practice, it has been found convenient to prepare a dry mixture of the following:

| | Parts by weight |
|---|---|
| Chromic acid (ground flake) | 6 |
| Sodium dichromate | 1 |
| Ammonium sulfate | 1 |

A solution is prepared by taking 1 oz./gal. of the above mixture and dissolving it in water and adding 0.5% by volume of nitric acid. The solution is operated at room temperature with a 10 second dip. If a deeper color is desired, a longer dip time can be used.

If it is desired to produce clear or lighter colored coatings, the yellow iridescent coatings can be bleached by dipping in a caustic soda solution or other bleach dip.

The invention is hereby claimed as follows:

1. A chromate conversion coating composition comprising an aqueous solution of 0.05 to 0.4 ounce per gallon of sodium dichromate, 0.02 to 0.3 ounce per gallon of sulfamic acid, 0.02 to 0.3 ounce per gallon of boric acid, 0.01 to 0.2 ounce per gallon sodium silicofluoride, and 0.5% to 3.0% by volume of nitric acid.

2. A chromate conversion coating composition comprising an aqueous solution of 0.4 to 1.2 ounces per gallon of chromic acid, 0.05 to 0.25 ounce per gallon of sulfamic acid and 0.01 to 0.2 ounce of ammonium sulfate.

3. A chromate conversion coating composition comprising an aqueous solution of 0.05 to 0.3 ounce per gallon of sodium dichromate, 0.05 to 0.3 ounce per gallon of sodium silicofluoride, 0.05 to 0.3 ounce per gallon of ammonium sulfate and 0.5% to 4.0% by volume of nitric acid.

4. A chromate conversion coating composition comprising an aqueous solution of 0.1 to 2.5 ounces per gallon of chromic acid, 0.01 to 1.0 ounce per gallon of sodium dichromate, 0.01 to 1.0 ounce per gallon of ammonium sulfate and 0.1% to 2.0% by volume of nitric acid.

5. A process for producing a clear conversion coating on the surface of a metal consisting of zinc and cadmium, which comprises dipping a metal article of a metal selected from the group consisting of zinc and cadmium in a composition as claimed in claim 1.

6. A process for producing a yellow iridescent conversion coating on the surface of a metal consisting of zinc and cadmium, which comprises dipping a metal article of a metal selected from the group consisting of zinc and cadmium in a composition as claimed in claim 2.

7. A process for producing a clear conversion coating on the surface of a metal consisting of zinc and cadmium, which comprises dipping a metal article of a metal selected from the group consisting of zinc and cadmium in a composition as claimed in claim 3.

8. A process for producing a yellow iridescent conversion coating on the surface of a metal consisting of zinc and cadmium, which comprises dipping a metal article of a metal selected from the group consisting of zinc and cadmium in a composition as claimed in claim 4.

9. A process for producing a clear conversion coating on the surface of a metal consisting of zinc or cadmium which comprises dipping a metal article in a composition as claimed in claim 2 and then bleaching to remove the yellow color.

10. A process for producing a clear conversion coating on the surface of a metal consisting of zinc or cadmium, which comprises dipping a metal article in a composition as claimed in claim 4 and then bleaching to remove the yellow color.

References Cited

UNITED STATES PATENTS

| | | | |
|---|---|---|---|
| 2,433,723 | 12/1947 | Wieczorek | 148—6.21 |
| 2,434,525 | 1/1948 | Thomas et al. | 148—6.21 |
| 2,548,419 | 4/1951 | Chester et al. | 148—6.21 X |
| 2,904,414 | 9/1959 | Ostander et al. | 148—6.21 X |
| 3,121,032 | 2/1964 | Seyb | 148—6.21 |

RALPH S. KENDALL, Primary Examiner